March 29, 1966 G. O. TUFTS 3,243,028
BALE TURNER AND ALIGNER
Filed April 30, 1964
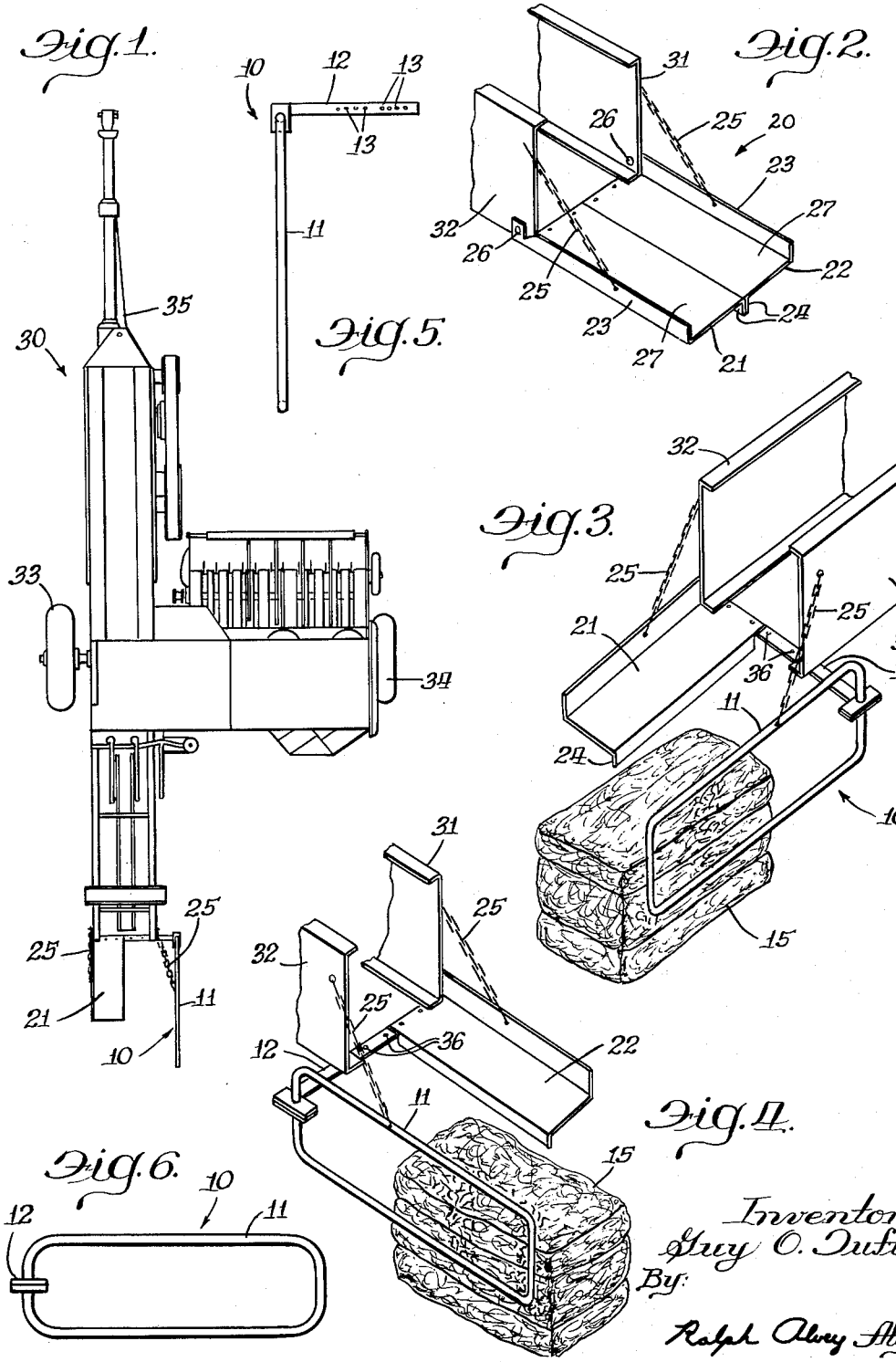
Inventor:
Guy O. Tufts
By:
Ralph Alvey Atty.

United States Patent Office 3,243,028
Patented Mar. 29, 1966

3,243,028
BALE TURNER AND ALIGNER
Guy O. Tufts, Phoenix, Ariz., assignor to International Harvester Company, Chicago, Ill., a corporation of New Jersey
Filed Apr. 30, 1964, Ser. No. 363,871
3 Claims. (Cl. 193—5)

This invention comprises a combined bale turner and a bale aligner for use with a field hay baler. In particular, the novel device limits the roll of a bale of hay as it falls laterally from the bale discharge chute of a baler and also aligns the bale with the line of travel of the baler, should the bale be pushed out of alignment.

Certain things are generally true about the bales of hay. For example, the breadth of a bale usually is greater than its thickness, so that of the six sides of a bale, the top and bottom surfaces have the greatest area. Also, bales are ordinarily bound lengthwise along their top and bottom surfaces. And, when a bale is discharged from a baler, it normally lands on its bottom side. In this position drying of the bale is impeded, while rotting of the binding material is promoted.

It is desirable, therefore, that bales be rolled ninety degrees as they drop to the ground, so that they land on a side. Thus, the top and bottom surfaces are both exposed to the air, thereby improving drying conditions and keeping the binding material out of contact with the ground.

Prior art bale turners (e.g. U.S. Patent No. 2,947,400) are not reversible (i.e. cannot be installed on either side of a baler) nor do they maintain bale alignment under severe conditions (i.e. when the baler suddenly changes course). The fact that prior art bale turners are not reversible makes them virtually useless during back swathing of a field. If bales are rolled off the baler chute in the usual direction (i.e. to the left) during back swathing, they land directly in the path to be travelled by the tractor on the next circuit of the field and have to be moved by hand to clear the way for the tractor. By making the bale turner reversible, however, it can be changed to roll the bales to the right during back swathing, so that they land clear of the line of travel of the tractor on its next circuit.

Similarly, the fact that prior art bale turners do not keep the bales aligned with the direction of travel of the baler lessens the efficiency of automatic bale loading machinery subsequently used to remove the bales from the field, since the course of the loader must repeatedly be altered to compensate for misalignment of the bales. Bales become misaligned when a wheel of the baler hits an obstruction in the field (e.g. a rut or boulder) at the moment a bale is falling to the ground. When the baler wheel strikes the obstruction, the baler momentarily changes its course and deposits the bale at an angle to the normal line of travel of the baler. If the bale turner is made as herein disclosed, however, such misalignment is prevented to a substantial degree.

The object of this invention is to overcome the above problems. Specifically, one object of this invention is to provide a reversible bale turner for rolling bales either to the left or right, as required by field operating conditions.

Another specific object of this invention is to provide a bale turner capable of keeping bales aligned with the line of travel of the baler under severe operating conditions.

The novel bale turner and aligner forming the present invention is shown in the drawings, where:

FIG. 1 is a plan view of a hay baler, showing the relative position of the invention to the other parts of the baler;

FIG. 2 is an isometric detail of the bale chute;

FIG. 3 is an isometric detail of the bale turner, as used to drop bales to the right side of the baler;

FIG. 4 is an isometric detail of the bale turner, as used to drop bales to the left of the baler;

FIG. 5 is a plan view of the bale turner and its mounting bracket; and

FIG. 6 is a side elevation of the bale turner of FIG. 5.

The bale turner 10 (FIGS. 5 and 6) comprising the present invention is used with a hay baler 30 (FIG. 1) to limit the roll and to align bales as they drop from the bale chute half section 2. The complete bale chute assembly 20 (FIG. 2) is used to slide bales into a wagon trailing the baler or lay the bales on the ground. Each identical half section 21 and 22 of chute assembly 20 comprises a Z-shaped metal plate with a flat, chute portion 27, a side wall 23 for lateral guidance of the bales, and a center flange 24 forming a surface for bolting the two halves together. The weight of the chute assembly 20 and any bales carried by it are supported by the chains 25, which join each chute side wall 23 to the corresponding baler side 31 or 32, and by the bolts 26, which pivotally connect each chute side wall 23 to one of the baler sides 31 or 32. Since the lengths of chains 25 are adjustable, the angle of inclination of chute assembly 20 can be varied as needed.

To roll bales laterally off of the chute assembly 20, a half chute section 21 or 22 is removed and the bale turner 10 installed in its place. Bale turner 10 (FIGS. 5 and 6) comprises a symmetrical pipe loop 11 attached at the midpoint of one of its ends 14 to a flat bracket member 12, both horizontal sides of which are identical. A plurality of holes 13 spaced along bracket 12 are used to bolt the bale turner 10 to the baler, as at 36 in FIGS. 3 and 4, the holes 13 being spaced empirically, so that the bale turner may be used with different makes of balers. The space separating the bale turner loop 11 from the center flange 24 of the chute section 21 or 22 must be large enough to allow the bale to pass downward as it rolls off the side of the chute section. For a bale 14 inches high by 18 inches wide, for example, a spacing of 18 inches is adequate. Pipe loop 11 is considerably longer than the chute sections 21 or 22, the extra length serving to align the bales along the line of travel of the baler (see below). Since loop 11 is symmetrical and bracket 12 identical on both horizontal sides, bale turner 10 can be installed on either side of the baler. The turner is adapted for use on a different side of the baler by being turned bottom side up.

The combined bale turner and bale aligner 10 operates in the following manner: As a bale of hay emerges from the baling chamber and is forced out onto chute 20 by subsequent bales of hay being formed by the baler, the emerging bale rolls laterally, to the side on which the half section of bale chute is removed (e.g. to the right in FIG. 3 and to the left in FIG. 4). The roll or fall of the bale is broken by the pipe loop 11 and is limited to ninety degrees. Since the bale enters onto the chute with one of its wider sides face down, the ninety degree roll repositions the bale with one of its narrow sides face down. The bale lands on the latter side, its rear end touching the ground first.

Loop 11 also acts to realign the bale with the line of travel of the baler if the bale is pushed out of alignment while falling to the ground. For example, if the right wheel 34 (FIG. 1) of the baler strikes an obstruction, the forward motion of the right wheel will be briefly stopped, causing the rear of baler 30 to swing to the left. If a bale is falling to the ground from chute 21 (FIG. 3) or chute section 22 (FIG. 4) at this moment, the bale will land diagonal to the line of travel of the baler. Since the baler, in general, continues to move forward, the chute section and the loop 11 tend to move clear of the bale. However, since the change of course of the baler is ordinarily quickly corrected and since loop 11 is considerably longer than the chute section, a sufficient length of loop 11 remains in contact with the bale, as the baler corrects course, to push the bale back into alignment with the line of travel of the baler. It is to be noted that the baler is not thrown off course to as great a degree when the left wheel 33 strikes an obstruction, since hitch 35 (FIG. 1) of the baler is nearly in line with the left wheel 33.

In the foregoing description, new and improved bale turner and aligner has been presented. The invention is not, however, limited to the exact form shown and described but embraces, as well, all equivalent forms that fall within the spirit and scope of the attached claims.

The invention claimed is:

1. A bale turner and aligner assembly for a baler having a bale chamber, said bale chamber having a designated width, a lower, bale-supporting surface, and a bale discharge, a bale discharge chute attached to said baler at said bale discharge, said bale chute having a width less than said designated width of said bale chamber, said bale chute also having a designated length and a rear end, said bale chute forming a generally horizontal extension of said bale-supporting surface at one side of said bale chamber, said bale turner and aligner assembly comprising: an elongated member for turning and aligning bales, said elongated member having a considerably greater length than said designated length of said bale chute, said elongated member also having a rear end, means on said elongated member for attaching said elongated member to said baler at said bale discharge with said elongated member extending alongside said chute and spaced therefrom and with said rear end of said elongated member located a considerable distance to the rear of said rear end of said bale chute.

2. A bale turner and aligner as recited in claim 1, wherein: said elongated member comprises a rectangular shaped loop the longer sides of which extend lengthwise of said bale chute when said elongated member is mounted on said baler and the shorter sides of which form the ends of said elongated member.

3. A bale turner and aligner as recited in claim 2, wherein said means for attaching said elongated member to said baler comprises a bracket attached to one of said shorter sides of said loop at about the midpoint of said one shorter side and projecting therefrom in a direction transverse to said longer sides of said loop, said bracket having an outer end in said transverse direction, means on said outer end of said bracket for attaching said bracket to said baler at said bale discharge.

References Cited by the Examiner

UNITED STATES PATENTS

| | | | |
|---|---|---|---|
| 2,853,171 | 9/1958 | Matthews | 193—43 |
| 2,947,400 | 8/1960 | Murray et al. | 193—5 |
| 3,161,008 | 12/1964 | Shepley et al. | 193—43 X |

EVON C. BLUNK, *Primary Examiner.*

SAMUEL F. COLEMAN, A. L. LEVINE,
*Assistant Examiners.*